(12) United States Patent
Voeltzel et al.

(10) Patent No.: US 7,223,940 B2
(45) Date of Patent: May 29, 2007

(54) HEATABLE WINDSHIELD

(75) Inventors: Charles S. Voeltzel, New Kensington, PA (US); Bruce A. Bartrug, Lower Burrell, PA (US); James J. Finley, Pittsburgh, PA (US); Allen R. Hawk, Freeport, PA (US); Lewis R. Palka, Cranberry, PA (US); Frank J. Pazul, Lower Burrell, PA (US); John A. Winter, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 11/063,315

(22) Filed: Feb. 22, 2005

(65) Prior Publication Data

US 2006/0186105 A1    Aug. 24, 2006

(51) Int. Cl.
*B60L 1/02* (2006.01)

(52) U.S. Cl. .................. 219/203; 219/522; 219/543; 428/630; 428/632

(58) Field of Classification Search .............. 219/203, 219/522, 541, 523, 544; 392/435, 430; 428/630, 632, 633
See application file for complete search history.

(56) References Cited

U.S. PATENT DOCUMENTS

| | | | |
|---|---|---|---|
| 2,256,642 A | 9/1941 | Gaut et al. | |
| 3,067,310 A | 12/1962 | Walz et al. | |
| 3,762,988 A | 10/1973 | Clock et al. | 161/183 |
| 4,287,107 A | 9/1981 | Hermann et al. | 260/28.5 |
| 4,379,040 A | 4/1983 | Gillery | 204/192 |
| 4,385,226 A | 5/1983 | Sauer et al. | |
| 4,443,691 A * | 4/1984 | Sauer | 219/522 |
| 4,504,109 A | 3/1985 | Taga et al. | 350/1.6 |
| 4,610,771 A | 9/1986 | Gillery | 204/192.1 |
| 4,716,086 A | 12/1987 | Gillery et al. | 428/630 |
| 4,725,710 A | 2/1988 | Ramus et al. | |
| 4,746,347 A | 5/1988 | Sensi | 65/94 |
| 4,778,732 A * | 10/1988 | Hasegawa et al. | 428/630 |
| 4,792,536 A | 12/1988 | Pecoraro et al. | 501/70 |
| 4,806,220 A | 2/1989 | Finley | 204/192.27 |
| 4,834,857 A | 5/1989 | Gillery | 204/192.27 |
| 4,861,669 A | 8/1989 | Gillery | 428/434 |
| 4,898,789 A | 2/1990 | Finley | 428/623 |
| 4,898,790 A | 2/1990 | Finley | 428/623 |
| 4,900,633 A | 2/1990 | Gillery | 428/432 |
| 4,902,580 A | 2/1990 | Gillery | 428/623 |
| 4,920,006 A | 4/1990 | Gillery | 428/432 |

(Continued)

FOREIGN PATENT DOCUMENTS

GB    2 302 102 A    1/1997

(Continued)

*Primary Examiner*—Robin Evans
*Assistant Examiner*—Leonid M. Fastovsky
(74) *Attorney, Agent, or Firm*—Andrew C. Siminerio (57) ABSTRACT

An electrically heatable transparency has at least one substrate, a first bus bar spaced from a second bus bar, and a conductive coating formed over at least a portion of the substrate. The first and second bus bars are in electrical contact with the coating. At least one of the bus bars has an end region in electrical contact with the coating. The end region is tapered such that the coating is of substantially uniform thickness on the end region.

14 Claims, 3 Drawing Sheets

U.S. PATENT DOCUMENTS

| | | | |
|---|---|---|---|
| 4,938,857 A | 7/1990 | Gillery | 204/192.27 |
| 4,948,677 A | 8/1990 | Gillery | 428/623 |
| 4,952,423 A | 8/1990 | Hirata et al. | 427/109 |
| 5,028,759 A | 7/1991 | Finley | 219/203 |
| 5,059,295 A | 10/1991 | Finley | 204/192.27 |
| 5,240,886 A | 8/1993 | Gulotta et al. | 501/70 |
| 5,328,768 A | 7/1994 | Goodwin | 428/428 |
| 5,385,872 A | 1/1995 | Gulotta et al. | 501/71 |
| 5,393,593 A | 2/1995 | Gulotta et al. | 428/220 |
| 5,492,750 A | 2/1996 | Shumaker, Jr. et al. | 428/192 |
| 5,653,903 A | 8/1997 | Pinchok, Jr. et al. | 219/203 |
| 5,796,055 A | 8/1998 | Benson, Jr. et al. | 181/208 |
| 5,821,001 A | 10/1998 | Arbab et al. | 428/623 |
| 6,559,419 B1 * | 5/2003 | Sol et al. | 219/203 |
| 7,039,304 B2 * | 5/2006 | Gerhardinger et al. | 392/435 |
| 2003/0180547 A1 | 9/2003 | Buhay et al. | |

FOREIGN PATENT DOCUMENTS

JP          62456    *   2/1987

* cited by examiner

FIG. 9

HEATABLE WINDSHIELD

BACKGROUND OF THE INVENTION

1. Field of the Invention

This invention relates generally to a heatable transparency, such as a laminated vehicle windshield and, more particularly, to a heatable transparency having improved bus bar and safety features.

2. Technical Considerations

It has been known to pass electric current through a transparent, electrically conductive coating on a laminated vehicle windshield in order to raise the temperature of the windshield. Typically, a source of electrical potential is connected to the conductive coating through a pair of spaced bus bars positioned along opposite sides of the conductive coating. The bus bars are in electrical contact with the conductive coating in order to provide current flow through the coating between the bus bars. The bus bars have relatively lower resistivity compared to the conductive coating and distribute the current over the coating area to be heated. Conventional bus bars are typically formed by metallic foil strips or strips of metallic-ceramic frit material fused onto a surface of one of the sheets of the laminate. A conventional arrangement includes bus bars configured as substantially parallel strips on opposites sides of the conductive coating, with electrical leads attached to each bus bar.

Heatable windshields can also include a "cut-out" area along an edge of the windshield that is free of the conductive coating. This coating-free area permits the passage of electromagnetic energy, such as radio waves, through the windshield for uses such as an electronic toll collection (ETC) system. Conventional bus bar designs require the bus bar to bend around this coating free area to maintain contact with the conductive coating.

A crack in a heatable windshield or the conductive coating can alter the electric heating circuit in ways that can damage the transparency or the conductive coating or have other undesirable effects. A break in the conductive coating can increase the resistance in the coated areas, with the result that the power output increases in the affected area. The increased power can raise temperatures to such an extent that the transparency can be thermally damaged. Excessive temperatures can extend propagation of a crack in the glass or can melt the plastic interlayer of the windshield.

Therefore, it would be advantageous to provide a transparency, such as a laminated automotive transparency, having an improved bus bar design that allows for easier and less costly manufacture as well as improving the electrical connection between the bus bars and conductive coating. It would also be advantageous to provide a laminated transparency that provides an arrangement for detecting a crack in the transparency and/or the conductive coating.

SUMMARY OF THE INVENTION

The present invention provides an electrically heatable transparency, comprising: at least one substrate; a first bus bar spaced from a second bus bar; and an electrically conductive coating formed over at least a portion of the substrate, with the first and second bus bars in electrical contact with the coating, wherein at least one of the bus bars has an edge region in electrical contact with the coating, and the edge region is tapered such that the coating is of substantially uniform thickness on the edge region.

The present invention also provides an electrically heatable transparency, comprising: at least one substrate; at least one bus bar carried on the substrate; a conductive coating over at least a portion of the substrate; and a conductive bridge extending between and electrically interconnecting the bus bar and the coating.

The present invention further provides an electrically heatable transparency, comprising: a substrate; at least one bus bar; and a conductive coating in electrical contact with the bus bar, wherein the conductive coating includes a cut-out area, and the bus bar comprises a first portion, a second portion, and a middle portion, wherein the middle portion has a first segment extending between the first and second portions and spaced from the coating and a second segment in electrical contact with the coating and generally following an outline of the cut-out area, and wherein the first and second portions have a first width and the first and second segments of the middle portion have a second width less than the first width.

The present invention also provides an electrically heatable transparency, comprising: a substrate; at least one bus bar; and a conductive coating in electrical contact with the bus bar, wherein the bus bar comprises a plurality of separate, spaced apart metallic pieces in contact with a conductive extension strip in electrical contact with a power source.

BRIEF DESCRIPTION OF THE DRAWINGS

Additional advantages and details of the invention are described below with reference to the exemplary embodiments illustrated in the accompanying drawing figures, in which like reference numbers identify like parts throughout.

DESCRIPTION OF THE PREFERRED EMBODIMENTS

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. All documents referred to herein are to be understood to be incorporated by reference in their entirety. As used herein, the terms "polymer" or "polymeric" refer to oligomers, homopolymers, copolymers, and terpolymers, e.g., polymers formed from two or more types of monomers or polymers. The terms "visible region" or "visible light" refer to electromagnetic radiation having a wavelength in the range of 380 nm to 800 nm. The terms "infrared region" or "infrared radiation" refer to electromagnetic radiation having a wavelength in the range of greater than 800 nm to 100,000 nm. The terms "ultraviolet region" or "ultraviolet radiation" mean electromagnetic energy having a wavelength in the range of 300 nm to less than 380 nm.

In the following discussion, features of the invention will be discussed generally with reference to use in a laminated vehicle transparency, such as a vehicle windshield. However, it is to be understood that the specifically disclosed exemplary embodiments are presented simply to explain the general concepts of the invention and that the invention is not limited to these specific exemplary embodiments. As would be appreciated by those skilled in the art, the invention can be practiced in many fields, such as but not limited to, laminated or non-laminated residential and/or commercial windows, insulating glass units, and/or transparencies for land, air, space, above water and under water vehicles, e.g., automotive windshields, sidelights, back lights, sunroofs, and moon roofs, just to name a few.

Figure 1:
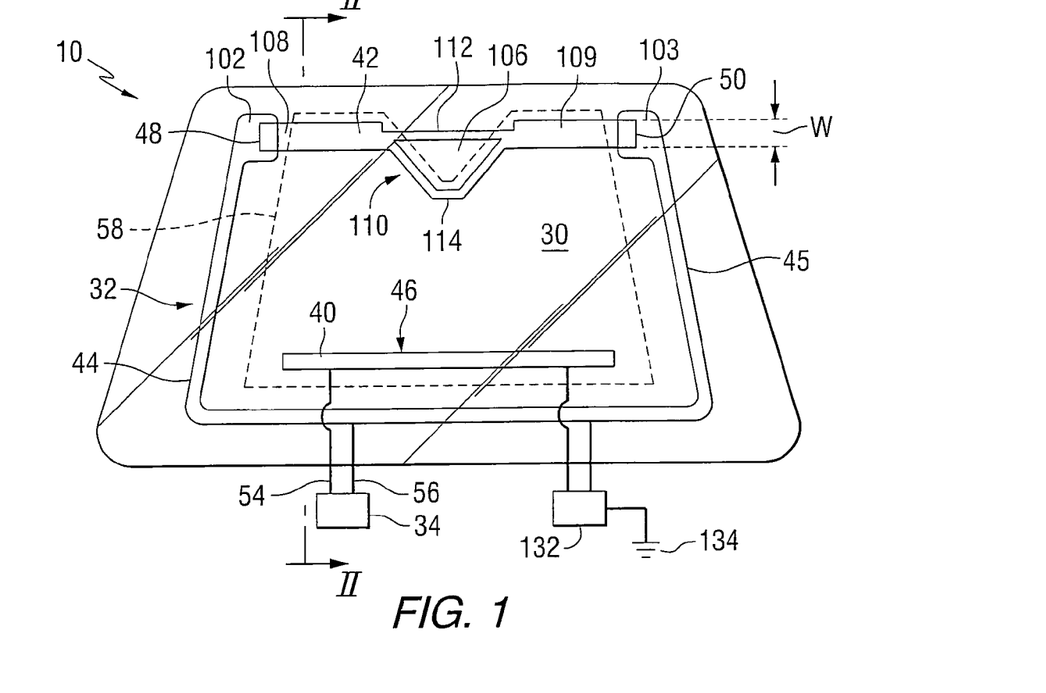
FIG. 1 is a plan view of a heatable laminated transparency incorporating features of the invention.
Figure 2:
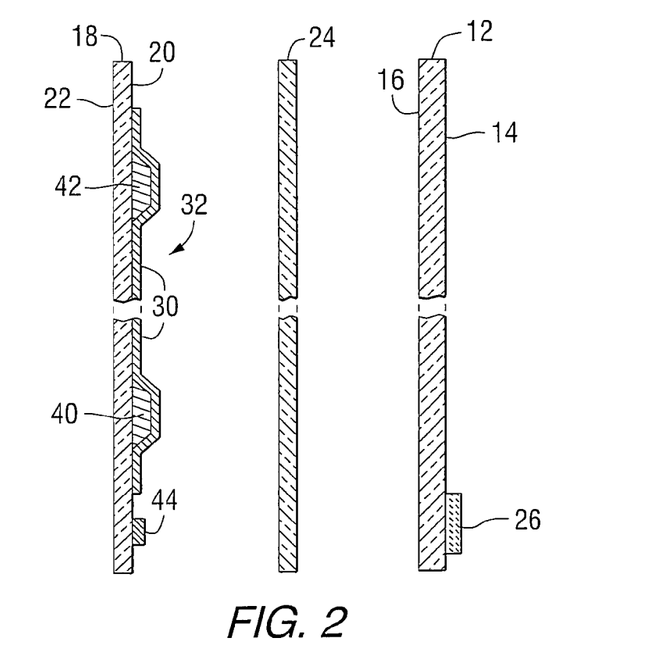
FIG. 2 is a sectional view taken along the line 2—2 of FIG. 1.

An exemplary non-limiting automotive transparency 10 incorporating features of the invention is illustrated in FIGS. 1 and 2. The transparency 10 can have any desired visible light, infrared radiation, or ultraviolet radiation transmission and reflection. For example, the automotive transparency 10 can have a visible light transmission of any desired amount, e.g., greater than 0% to 100%, e.g., greater than 70%. For windshield and front sidelight areas, the visible light transmission is typically greater than or equal to 70% for use in the United States. For privacy areas, such as rear seat sidelights and back windows, the visible light transmission can be less than that for the non-privacy areas, such as less than 70%.

As best seen in FIG. 2, the transparency 10 includes a first ply 12 with a major surface facing the vehicle interior, i.e., an inner major surface 14, and an opposed or outer major surface 16. The transparency 10 also includes a second ply 18 having an inner major surface 20 and an outer major surface 22. The first and second plies 12, 18 can be bonded together in any suitable manner, such as by an interlayer 24. Although not required, a conventional edge sealant can be applied to the perimeter of the laminated transparency 10 during and/or after lamination in any desired manner. A decorative band 26 (shown only in FIG. 2), e.g., an opaque, translucent or colored shade band, such as a ceramic band, can be provided on a surface of at least one of the plies 12, 18, for example around the perimeter of the inner major surface 14 of the first ply 12. A conductive coating 30 is formed over at least a portion of one of the plies 12, 18 and a bus bar assembly 32 is in electrical contact with the conductive coating 30. The bus bar assembly 32 is also connected to an electrical power source 34 (shown only in FIG. 1) and will be discussed in more detail below.

In the broad practice of the invention, the plies 12, 18 of the transparency 10 can be of the same or different materials. The plies 12, 18 can include any desired material having any desired characteristics. For example, one or more of the plies 12, 18 can be transparent or translucent to visible light. By "transparent" is meant having visible light transmittance of greater than 0% to 100%. Alternatively, one or more of the plies 12, 18 can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or more of the plies 12, 18 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat treated glass. As used herein, the term "heat treated" means tempered or at least partially tempered. The glass can be of any type, such as conventional float glass or flat glass, and can be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. The ribbon is then cut into sheets that are subsequently shaped and/or heat-treated as desired. Examples of float glass processes are disclosed in U.S. Pat. Nos. 4,466,562 and 4,671,155. The first and second plies 12, 18 can each be, for example, clear float glass or can be tinted or colored glass or one ply can be clear glass and the other colored glass. Although not limiting to the invention, examples of glass suitable for the first ply and/or second ply are described in U.S. Pat. Nos. 4,746,347; 4,792,536; 5,240,886; 5,385,872; and 5,393,593. The first and second plies can be of any desired dimensions, e.g., length, width, shape, or thickness. In one exemplary automotive transparency, the first and second plies can each be 1 mm to 10 mm thick, e.g., 1 mm to 5 mm thick, or 1.5 mm to 2.5 mm, or 1.8 mm to 2.3 mm.

The interlayer 24 can be of any desired material and can include one or more layers or plies. The interlayer 24 can be a polymeric or plastic material such as, for example, polyvinyl butyral, plasticized polyvinyl chloride, or multi-layered thermoplastic materials including polyethylene terephthalate, etc. Suitable interlayer materials are disclosed, for example but not to be considered as limiting, in U.S. Pat. Nos. 4,287,107 and 3,762,988. The interlayer 24 secures the first and second plies 12, 18 together, provides energy absorption, reduces noise, and increases the strength of the laminated structure. The interlayer 24 can also be a sound absorbing or attenuating material as described, for example, in U.S. Pat. No. 5,796,055. The interlayer 24 can have a solar control coating provided thereon or incorporated therein or can include a material that imparts a color to the interlayer and/or enhances the solar properties of the laminate, e.g. reduces solar energy transmission.

The coating 30 is an electrically conductive coating deposited over at least a portion of a surface of one of the glass plies, such as on the inner surface 20 of the outboard glass ply 18 (as shown in FIG. 2). The conductive coating 30 can include one or more metallic films positioned between pairs of dielectric layers applied sequentially over at least a portion of one of the glass sheets as is known in the art. The conductive coating 30 can be a heat and/or radiation reflecting coating and can have one or more coating layers or films of the same or different composition and/or functionality. As used herein, the term "film" refers to a coating region of a desired or selected coating composition. A "layer" can comprise one or more "films" and a "coating" or "coating stack" can comprise one or more "layers". For example, the conductive coating 30 can be a single layer coating or a multi-layer coating and can include one or more metals, non-metals, semi-metals, semiconductors, and/or alloys, compounds, compositions, combinations, or blends thereof. For example, the conductive coating 30 can be a single layer metal oxide coating, a multiple layer metal oxide coating, a non-metal oxide coating, a metallic nitride or oxynitride coating, a non-metallic nitride or oxynitride coating, or a multiple layer coating comprising one or more of any of the above materials. In one non-limiting embodiment, the conductive coating can be a doped metal oxide coating.

The coating 30 can be a functional coating. As used herein, the term "functional coating" refers to a coating that modifies one or more physical properties of the substrate over which it is deposited, e.g., optical, thermal, chemical or mechanical properties, and is not intended to be entirely removed from the substrate during subsequent processing. The conductive coating 30 can have one or more functional coating layers or films of the same or different composition or functionality.

The conductive coating 30 can be, for example, an electrically conductive coating used to make heatable windows as disclosed in U.S. Pat. Nos. 5,653,903 and 5,028,759, or a single-film or multi-film coating used as an antenna. Likewise, the conductive coating 30 can be a conductive, solar control coating. As used herein, the term "solar control coating" refers to a coating comprised of one or more layers or films that affect the solar properties of the coated article, such as but not limited to the amount of solar radiation, for example, visible, infrared, or ultraviolet radiation, reflected from, absorbed by, or passing through the coated article, shading coefficient, emissivity, etc. The solar control coating can block, absorb or filter selected portions of the solar spectrum, such as but not limited to the IR, UV, and/or visible spectrums. Examples of solar control coatings that can be used in the practice of the invention are found, for example but not to be considered as limiting, in U.S. Pat. Nos. 4,898,789; 5,821,001; 4,716,086; 4,610,771; 4,902,580; 4,716,086; 4,806,220; 4,898,790; 4,834,857; 4,948,677; 5,059,295; and 5,028,759, and also in U.S. patent application Ser. No. 09/058,440.

The conductive coating 30 can also be an electroconductive low emissivity coating that allows visible wavelength energy to be transmitted through the coating 30 but reflects longer-wavelength solar infrared energy. By "low emissivity" is meant emissivity less than 0.4, such as less than 0.3, such as less than 0.2, such as less than 0.1, e.g., less than or equal to 0.05. Examples of low emissivity coatings are found, for example, in U.S. Pat. Nos. 4,952,423 and 4,504,109 and British reference GB 2,302,102.

Non-limiting examples of suitable conductive coatings 30 for use with the invention are commercially available from PPG Industries, Inc. of Pittsburgh, Pa. under the SUNGATE® and SOLARBAN® families of coatings. Such coatings typically include one or more anti-reflective coating films comprising dielectric or anti-reflective materials, such as metal oxides or oxides of metal alloys, which are transparent to visible light. The conductive coating 30 can also include one or more infrared reflective films comprising a reflective metal, e.g., a noble metal such as gold, copper or silver, or combinations or alloys thereof, and can further comprise a primer film or barrier film, such as titanium, as is known in the art, located over and/or under the metal reflective layer. The conductive coating 30 can have any desired number of infrared reflective films, such as 1 or more silver layers, e.g., 2 or more silver layers, e.g., 3 or more silver layers. A non-limiting example of a coating having three silver layers is disclosed in U.S. patent application Ser. No. 10/364,089 (Publication No. 180547A1).

The conductive coating 30 can be deposited by any conventional method, such as but not limited to conventional chemical vapor deposition (CVD) and/or physical vapor deposition (PVD) methods. Examples of CVD processes include spray pyrolysis, chemical vapor deposition (CVD), and sol-gel deposition. Examples of PVD processes include electron beam evaporation and vacuum sputtering (such as magnetron sputter vapor deposition (MSVD)). In one non-limiting embodiment, the conductive coating 30 can be deposited by MSVD. Examples of MSVD coating devices and methods will be well understood by one of ordinary skill in the art and are described, for example, in U.S. Pat. Nos. 4,379,040; 4,861,669; 4,898,789; 4,898,790; 4,900,633; 4,920,006; 4,938,857; 5,328,768; and 5,492,750.

The decorative band 26 can be on one or more of the surfaces of one of the glass plies 12, 18, and applied, e.g. by screen printing and firing the band onto the surface of the ply during heating of the ply for bending or in a separate heating step. In one non-limiting embodiment, the band 26 forms an opaque border about the periphery of the transparency 10 that serves to conceal attachment devices and other elements when installed in a vehicle and may also conceal portions of the bus bars of the bus bar assembly 32.

In the non-limiting embodiment illustrated in FIGS. 1 and 2, the bus bar assembly 32 includes a first or bottom bus bar 40 and a second or top bus bar 42 formed on the inner surface 20 of the outer ply 18. The conductive coating 30 is formed over the bus bars 40, 42 such that the bus bars 40, 42 are in electrical contact with the conductive coating 30. The bus bar assembly 32 also includes a pair of conductive leads or strips 44, 45 each extending from a terminal area 46 outwardly towards the edges of the glass ply 18 and then upwardly to contact opposed ends 48, 50 of the upper bus bar 42. The power source 34 is connected to the bottom bus bar 40 by a lead 54 and to the upper bus bar 42 by a lead 56 that contacts the strips 44, 45 in the terminal area 46. Although not limiting to the invention, the terminal area 46 can be located along the bottom edge of the transparency 10 as illustrated in FIG. 1. However, it should be appreciated that the terminal area 46 can be located at any convenient location about the periphery of the transparency 10. The bus bars 40, 42, and/or the conductive strips 44, 45 can be formed of conductive metal foil or strips (such as but not limited to copper foil or tinned copper foil), or can be formed by conductive coatings (such as ceramic coatings), or combinations thereof.

The power source 34 can be any conventional power source, such as but not limited to a conventional vehicle battery, for example a conventional eighteen or twenty-four volt vehicle battery. However, in one non-limiting embodiment, the power source 34 is a fourteen volt power source, such as a fourteen volt battery.

Line 58 in FIG. 1 indicates the outer edge of the conductive coating 30, which is spaced from the sides and bottom and top edges of the transparency 10, leaving an uncoated margin along the periphery of the transparency 10. These uncoated marginal areas can be created by masking those areas during the coating process. Optionally, the entire ply could be coated with the conductive coating 30 and then portions of the conductive coating 30 subsequently deleted from those areas in any conventional manner. The uncoated marginal areas permit electrical connections to be made to the upper bus bar 42 without the conductive strips 44, 45 contacting the conductive coating 30.

Figure 3:
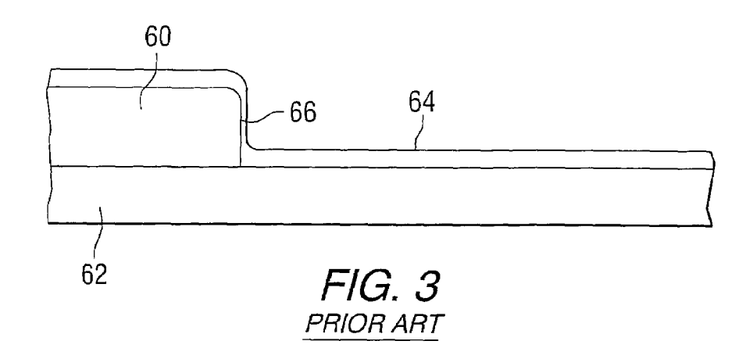
FIG. 3 shows a known connection between a conventional bus bar and a conductive coating.

FIG. 3 shows a conventional heatable windshield bus bar and coating connection in which a bus bar 60 is deposited over a substrate 62 and then a conductive coating 64 is deposited over the substrate 62 and the bus bar 60. However, as will be appreciated by one skilled in the art, a problem can arise in this known bus bar and coating system in that the bus bar 60 is typically many orders of magnitude thicker than the conductive coating 64 and, thus, has an edge with a substantially vertical end surface 66. By "vertical end surface" is meant that at least a portion of the end surface of the bus bar 60, or even the majority of the end surface, extends generally perpendicularly to the surface of the substrate 62. Therefore, when the coating 64 is applied over the edge of the bus bar 60 by conventional coating methods, the portion of the coating 64 deposited on the vertical end surface 66 of the bus bar 60 can be thinner than along the upper horizontal surface 70 of the bus bar 60 because it is more difficult to achieve a uniformly thick coating on a vertical surface. This thinner coating area can decrease the electrical connection between the bus bar 60 and the coating 64. Additionally, if the coating 64 is a multi-layered coating, one or more of the coating layers can be too thin to perform it's intended purpose or can be missing or broken on the portion of the coating 64 deposited on the end surface 66.

Figure 4:
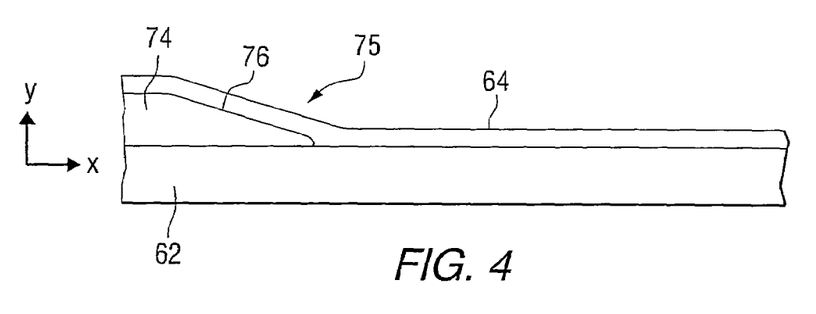
FIGS. 4–8 show various non-limiting bus bar and conductive coating connections incorporating features of the invention.

FIG. 4 shows an improved bus bar and coating configuration in accordance with the present invention. Rather than a conventional bus bar having a large vertical end surface, the bus bar 74 of the invention shown in FIG. 4 has a tapered or sloped edge 76. Thus, the conductive coating 64 is of a more uniform thickness in the connective area 75 between the bus bar 74 and the coating 64 on the substrate 62. In one non-limiting embodiment, the tapered bus bar edge 76 can have a slope (defined as the vertical distance "y" over the horizontal distance "x") in the range of 1:100 to 1:50, such as 1:20 to 1:10, such as 1:10 to 1:2, such as in the range of 1:100 to 1:1.5.

Figure 5:
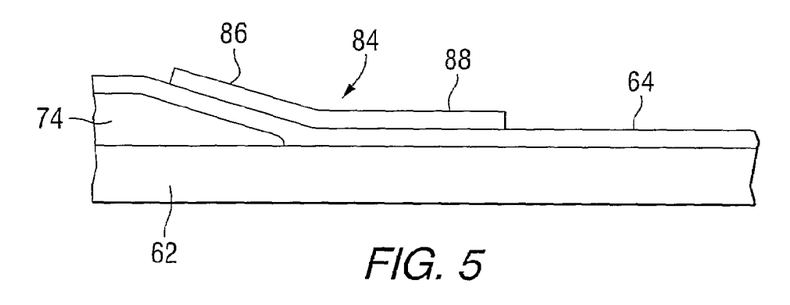

FIG. 5 shows another bus bar to conductive coating connection in accordance with the invention. This embodiment is similar to that of FIG. 4 but further includes an electrically conductive, e.g., metallic, bridge 84. The bridge 84 further improves the electrical connection between the bus bar 74 and the conductive coating 64. In the illustrated non-limiting embodiment, the bridge 84 includes two metallic, e.g., copper or tinned copper, legs 86, 88 with one leg 86 overlapping and in electrical contact with the bus bar edge 76 and the other leg 88 overlapping and in electrical contact with to coating 64 on the conductive coating 64 on the substrate 62.

Figure 6:
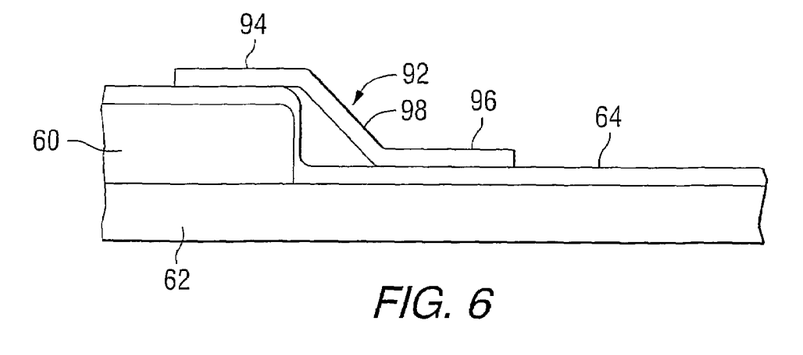

FIG. 6 shows a further bus bar and conductive coating connection in accordance with the invention that can be used to improve the connection between a conventional bus bar 60 and an conductive coating 64 shown in FIG. 3. In this non-limiting embodiment, a conductive, e.g., metallic, bridge 92 extends between the edge of the conventional bus bar 60 and the conductive coating 64 on the substrate 62. More particularly, the bridge 92 has a first portion 94 that contacts the portion of the coating 64 over the bus bar 60 and a second portion 96 that contacts the coating 64 on the surface of the substrate 62. An intermediate portion 98 connects the first and second portions 94, 96. The intermediate portion 98 bridges the edge region, e.g., vertical end, of the bus bar 60 where poor electrical connection can be typically expected and, thus, improves the electrical connection between the bus bar 60 and the coating 64 on the substrate 62. Portion 98 can be flat and sloped as shown in FIG. 6 or can have any other convenient configuration.

Figure 7:
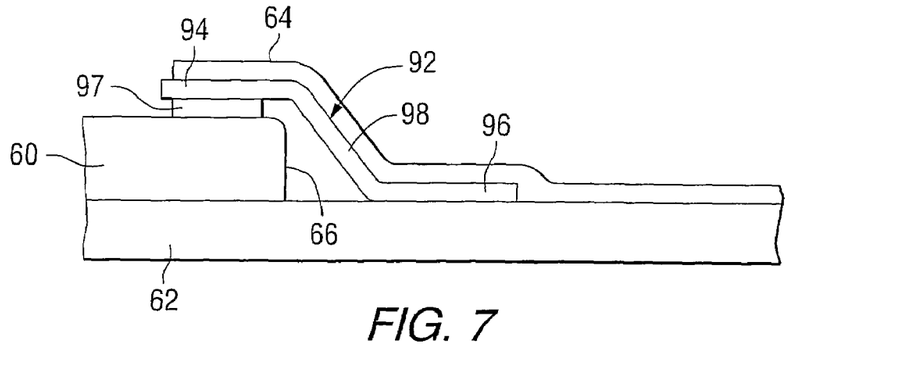

FIG. 7 shows another non-limiting bus bar and conductive coating connection in accordance with the invention. In this embodiment, rather than placing the bridge 92 of the invention on top of the conductive coating as in FIG. 6, one leg 94 of the bridge 92 is electrically connected to the bus bar 60, such as but not limited to by an indium-type solder 97 or an electrically conductive adhesive, and the other leg 96 is in contact with (or secured to) the substrate 62. The conductive coating 64 is deposited over the bus bar 60, bridge 92, and substrate 62 assembly. Since the intermediate portion 98 of the bridge 92 has a smaller slope than that of the conventional bus bar edge surface 66, the conductive coating 64 has less tendency to form shallow or thin areas on the bridge 92 and there is less disruption to the individual film layers of a multi-layered conductive coating 64. The intermediate portion 98 can have a slope such as that described above for the slope of the edge portion 76 (FIG. 4).

Figure 8:
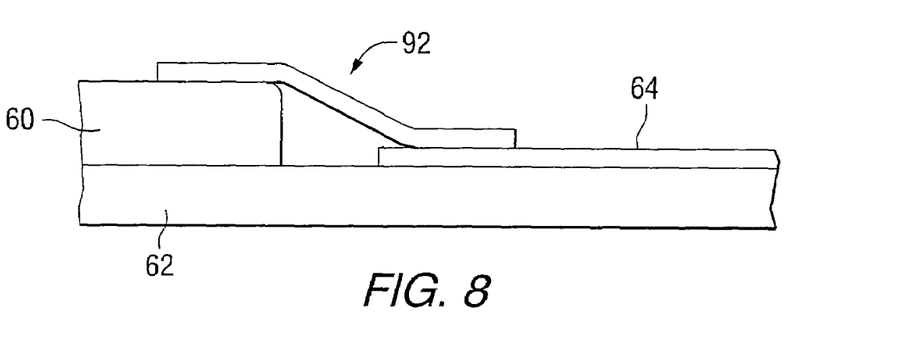

FIG. 8 is similar to the bridge configurations in FIGS. 6 and 7, wherein the bridge 92 is applied after the conductive coating 64 has been deposited. In one non-limiting embodiment, the coating 64 is deposited over a portion of the substrate 62 but is not deposited on the bus bar 60. Thus, the bus bar 60 is spaced from the edge of the coating 64 on the substrate. The bridge 92 electrically connects the bus bar 60 to the coating 64 on the substrate 62, with legs 94 and 96 overlapping bus bar 60 and coating 64, respectively. If desired, legs 94 and 96 can be secured in place, e.g. using a conductive adhesive.

In another non-limiting aspect of the invention illustrated in FIG. 1, the upper ends 102, 103 of the conductive strips 44, 45, respectively, can be elongated or enlarged and the upper bus bar 42 can be a metallic strip, such as a copper or tinned copper strip. The ends 48, 50 of the copper bus bar 42 can be positioned on the enlarged ends 102, 103 of the conductive coating strips 44, 45 without the use of adhesives or solder and then the transparency 10 laminated in conventional manner. Thus, no adhesives or similar materials are required between the ends 48, 50 of the copper bus bar 42 and the ends 102, 103 of the conductive strips 44, 45. However, in one non-limiting practice of the invention, solder, e.g., a low temperature indium solder, can be used to attach the ends 48, 50 of the top bus bar 42 to the ends 102, 103 of the strips 44, 45.

In a further non-limiting aspect of the invention shown in FIG. 1, the transparency 10 includes a cut-out portion 106 that is free of conductive coating material. Such a cut-out portion 106 is useful to allow electromagnetic or radio wave transmissions through the transparency without interference by the conductive coating 30. In conventional heatable windshields with coating free cut-out areas along the upper edge, the upper bus bar typically extends along the coating around the cut-out area and, thus, would be visible in the vision portion of the windshield. However, in the transparency 10 of the invention, in the region of the coating free cut-out portion 106, the upper bus bar 42 has side portions 108, 109 of a selected width W, e.g., selected to achieve a desired current flow through the bus bar 42. However, a middle portion 110 of the bus bar 42 has a first segment 112 extending between the side portions 108, 109 and a second segment 114 extending downwardly between the side portions 108, 109 and configured to generally follow the outline of the cut-out area 106. In one non-limiting embodiment, the cut-out area 106 and corresponding segment 114 can be generally "U-shaped" as shown in FIG. 1. The first and second segments 112, 114 are less wide than the side portions 108, 109 but the widths of the first and second segments 112, 114 are configured such that the current flow through the middle portion 110 is the same or substantially the same as that through the side portions 108, 109. The decrease in width of the first and second segments 112, 114 compared to the width of the side segments 108, 109 reduces the visibility of the second segment 114 of the bus bar 42 even if the segment 114 extends into the viewing area of the transparency 10.

In one non-limiting embodiment, a bridge member of the invention, for example as shown in FIGS. 4–7, can be used to electrically connect at least one of the bus bar side portions 108, 109, or the first segment 112, or the second segment 114 with the coating 30.

Figure 9:
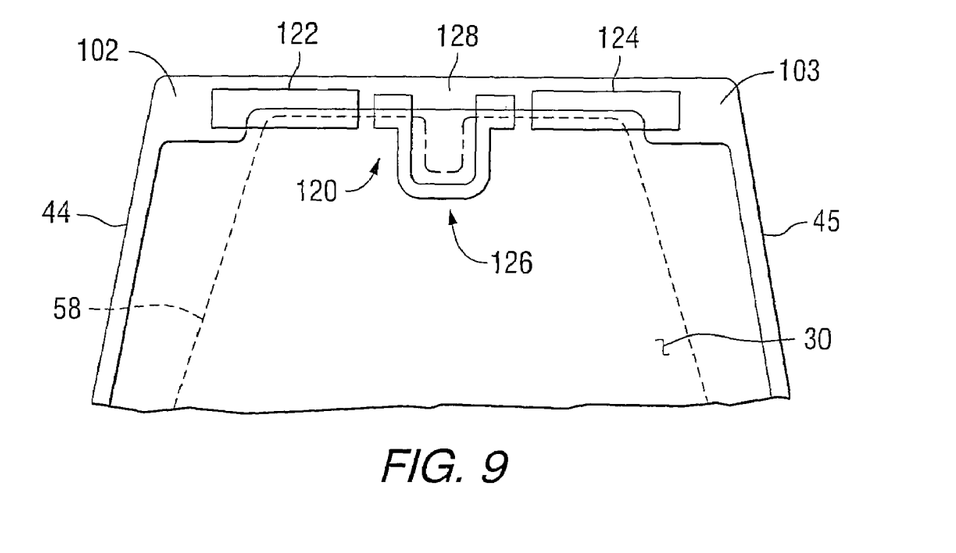
FIG. 9 shows a non-limiting bus bar configuration incorporating features of the invention.

An alternative upper bus bar 120 is shown in FIG. 9. In this non-limiting embodiment, the upper bus bar 120 is not a single, unitary piece but rather is divided into several discrete elements, such as but not limited to metal (e.g., copper) pieces or strips. In the illustrated non-limiting embodiment, the upper bus bar 120 comprises a first piece 122, a second piece 124, and a third piece 126. The conductive strips 44, 45 along the sides of the transparency 10 are extended to form an extension section 128 across the top of the transparency 10 and the separate pieces 122, 124, 126 of the upper bus bar 120 are in electrical contact with this extension section 128. Thus, electrical current from the side strips 44, 45 passes through the extension section 128 and into each of the bus bar pieces 122, 124, 126 to supply electricity to all of the bus bar pieces 122, 124, 126 and hence, into the conductive coating 30.

Although not required, the first and second bus bars 40, 42 can be connected to a comparator, e.g., a ground fault detector 132, which is further connected to a vehicle ground 134, as shown in FIG. 1. Thus, when a discrepancy in the current flow through the bus bars 40, 42 and conductive coating 30 is detected, indicating a crack in the conductive coating 30 and possibly the transparency 10, the electrical power from the first and second bus bars 40, 42 can be interrupted to prevent further damage to the transparency 10.

It will be readily appreciated by those skilled in the art that modifications can be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An electrically heatable transparency, comprising:
at least one substrate;
at least one bus bar carried on the substrate;
a conductive coating over at least a portion of the substrate; and
a conductive bridge extending between and electrically interconnecting the bus bar and the coating, wherein the conductive coating is deposited over at least a portion of the conductive bridge.

2. The transparency of claim 1, wherein the bridge includes a first portion positioned over and in electrical contact with at least a portion of the bus bar, and a second portion positioned under and in electrical contact with at least a portion of the coating.

3. The transparency of claim 2, wherein the bridge further includes an intermediate portion connecting the first and second portions.

4. An electrically heatable transparency, comprising:
at least one substrate;
at least one bus bar carried on the substrate;
a conductive coating over at least a portion of the substrate; and
a conductive bridge extending between and electrically interconnecting the bus bar and the coating,
wherein the bridge includes a first portion positioned over and in electrical contact with at least a portion of the bus bar, and a second portion positioned in electrical contact with at least a portion of the coating,
wherein the bridge further includes an intermediate portion connecting the first and second portions, and
wherein the coating is spaced from the bus bar and the intermediate portion is not in contact with the coating.

5. The transparency of claim 2, wherein the first portion of the bridge is electrically connected to the bus bar, the second portion is electrically connected to the substrate, and the conductive coating extends over at least a portion of both the first and second portions of the bridge.

6. The transparency of claim 5, wherein the conductive coating extends over at least a portion of the intermediate portion of the bridge.

7. The transparency of claim 2, wherein the conductive coating comprises at least two silver layers.

8. The transparency of claim 3, wherein at least one of the bus bars is in electrical contact with a 14 volt power source.

9. The transparency of claim 2, wherein the bridge comprises a copper foil.

10. An electrically heatable transparency, comprising:
a substrate;
at least one bus bar; and
a conductive coating in electrical contact with the bus bar,
wherein the conductive coating includes a cut-out area, and the bus bar comprises a first portion, a second portion, and a middle portion,
wherein the middle portion has a first segment extending between the first and second portions through the cut-out area and spaced from the coating and a second segment in electrical contact with the coating and generally following an outline of the cut-out area,
wherein the first and second portions have a first width and the first and second segments of the middle portion have a second width less than the first width, and
wherein the widths of the first and second segments are configured such that current flow through the middle portion is substantially the same as that through the first and second portions.

11. The electrically heatable transparency of claim 10, wherein the combined width of the first and second segments is substantially equal to the first width.

12. The electrically heatable transparency of claim 11, further including a ground fault detector connected to the transparency such that when a fault is detected indicating a break in the conductive coating, electrical power to the coating is interrupted.

13. The electrically heatable transparency of claim 1, further comprising a bottom bus bar and a top bus bar; and a conductive coating in electrical contact with the bars, wherein the first bus bar comprises a plurality of separate, spaced apart metallic pieces in contact with a conductive extension strip in electrical contact with a power source.

14. The electrically heatable transparency of claim 13, wherein the bus bar comprises a first piece, a second piece, and a "U"-shaped middle piece.

* * * * *